United States Patent [19]

Troy

[11] 4,146,839
[45] Mar. 27, 1979

[54] CHANNEL TRAFFIC MONITORING RADIO TRANSCEIVER

[76] Inventor: Stephen R. Troy, 717 Cottonwood Dr., Severna Park, Md. 21146

[21] Appl. No.: 765,710

[22] Filed: Feb. 4, 1977

[51] Int. Cl.² .............................................. H04B 7/00
[52] U.S. Cl. ...................................... 325/25; 325/52; 325/63
[58] Field of Search ................ 325/15, 17, 25, 51, 325/52, 53, 54, 56, 65, 67, 63, 55; 343/175, 176, 177, 179; 179/15 BZ, 42 A; 364/200, 900

[56] References Cited

U.S. PATENT DOCUMENTS

| | | | |
|---|---|---|---|
| 3,487,312 | 12/1969 | Egan et al. | 343/175 |
| 3,983,492 | 9/1976 | Fisher et al. | 325/63 |
| 4,013,958 | 3/1977 | Spayth | 343/177 |

*Primary Examiner*—Benedict V. Safourek
*Attorney, Agent, or Firm*—Joseph E. Rusz; Jacob N. Erlich

[57] ABSTRACT

A channel traffic monitoring radio transceiver having basic transceiver components in combination with a microcontroller which provides the electronic operations which enables the transceiver to automatically establish the least congested channel of communication of a plurality of channels. The microcontroller incorporates therein a digital multiplexer, channel counter, channel traffic memory, channel address display, program read only memory, mode select switch, clock and microprocessor. After operation for a short period of time under the appropriate program stored in the program memory, the channel address corresponding to the lowest traffic number will be shown on the channel address display. This channel will be the least congested channel for communication between parties making initial contact on a congested channel.

7 Claims, 2 Drawing Figures

CHANNEL TRAFFIC MONITORING RADIO TRANSCEIVER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to radio transceivers, and, more particularly to a radio transceiver which is capable of automatically establishing the least congested channel for communication between parties making initial contact on a congested calling channel.

Radio transceivers combine the best qualities of radio transmitting and receiving equipment in a common housing, and as a result thereof, although not limited thereto, usually are portable and capable of mobile use. Subsequently, the applications of radio transceivers have become widely diversified. For example, transceivers are readily acceptable in areas of public safety such as marine and aviation communications, police and fire protection, forestry conservation and highway traffic control. In addition, transceivers are found in areas of industrial use, land transportation, the wide field of broadcasting, weather reporting and military applications.

Radio transceivers are typically built to operate on one or more discrete preset switch-selected radio frequencies (channels) rather than being continuously tunable over a band of frequencies. Heretofore, transceivers needed one or sometimes two quartz crystals per channel as frequency standards in their oscillator circuits. The cost and size penalty of this requirement limited the number of channels a transceiver could feasibly be built to handle. The recent development of digital frequency synthesizers in the form of monolithic integrated circuits does away with this limitation. A synthesizer performs a binary arithmetic operation on the output of a single crystal frequency standard, allowing the transceiver to tune a large number of channels. The operator merely sets the Channel Selector Switches to the desired channel.

A common procedure used with tactical radio transceivers, particularly where radio traffic is heavy, is to designate a calling channel or channels. Once contact is made on a calling channel, the parties agree to switch to an alternate channel. Unfortunately, with today's equipment, they have no way of knowing whether the alternate channel they are selecting is vacant, or whether it may at that moment be even more congested than the calling channel, causing possibly serious confusion and delay. Presently there is no equipment available which will allow, in a reliable and inexpensive manner, the utilization of radio transceivers so as to provide an optimal choice of alternate radio channels for parties making contact on a congested calling channel.

SUMMARY OF THE INVENTION

The instant invention overcomes the problems set forth hereinabove by providing a radio transceiver which is capable of automatically establishing the least congested channel for communication between parties.

The radio transceiver of this invention utilizes the components of commercially available transceivers in use today in combination with a microcontroller which provides the electronic operations which enables the transceiver to automatically establish the least congested channel for communication. The microcontroller incorporates therein a number of electronic components such as a digital multiplexer, channel counter, channel traffic memory, channel address display, program read only memory (ROM), mode select switch, clock and microprocessor.

After the transceiver has operated a relatively short period of time under control of the appropriate program within the program ROM, the channel traffic memory will contain a traffic number for each channel, showing the relative traffic on each channel. The lowest-valued traffic number will be stored in an internal register within the microprocessor for comparison with each new traffic number as it comes along. The channel address corresponding to the lowest traffic number will be shown on the channel address display. This channel is the least congested channel and should be chosen as the best alternate channel by parties making initial contact on a calling channel.

It is therefore an object of this invention to provide a radio transceiver which automatically establishes the least congested channel by communication of a plurality of channels.

It is another object of this invention to provide a radio transceiver which can be readily implemented to accept other sophisticated processing techniques.

It is still another object of this invention to provide a method of establishing the least congested channel of communication of a plurality of channels of communication via a radio transceiver.

It is a further object of this invention to provide a radio transceiver which is economical to produce, reliable in operation and which utilizes conventional, currently available components in the manufacture thereof.

For a better understanding of the present invention together with other and further objects thereof reference is made to the following description taken in conjunction with the accompanying drawing and its scope will be pointed out in the appended claims.

DETAILED DESCRIPTION OF THE PREFERRED EMBODIMENT

Figure 1:
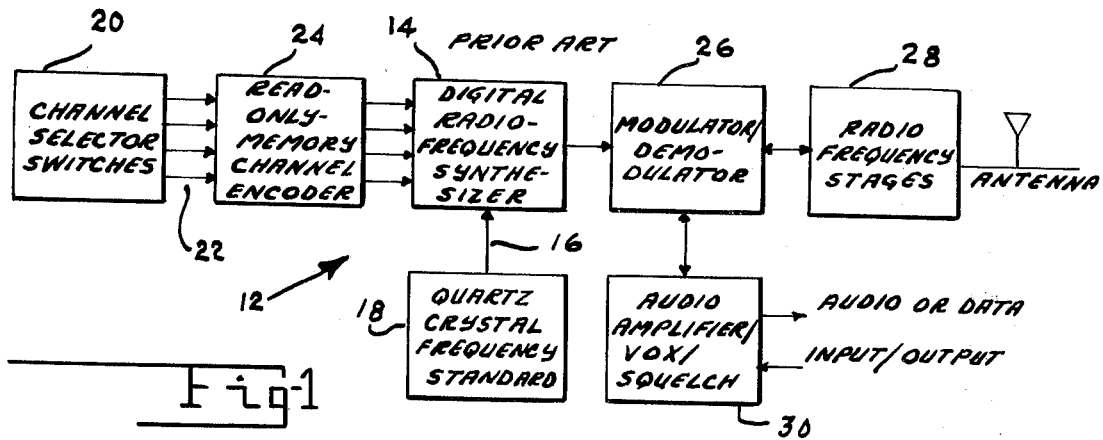
FIG. 1 is a schematic representation of a typical prior art modern radio transceiver.

In order to provide a better understanding of the Chennel Traffic Monitoring Radio Transceiver 10 of this invention (shown in FIG. 2 of the drawing), reference is first made to FIG. 1 of the drawing which is representative of a conventional radio transceiver 12 in use today. Since all elements which make up transceiver 12 are conventional and readily available, only a brief descriptive analysis of transceiver 12 is presented hereinbelow.

Within transceiver 12 a synthesizer 14 performs an arithmetic operation on the output 16 of a single crystal frequency standard 18, allowing transceiver 12 to tune a large number of channels. In use, an operator sets the channel selector switches 20 to the desired channel of operation, with output 22 from switches 20 forming a channel address. Output 22 is fed into a conventional read only memory (ROM) 24. Stored within ROM 24 at that particular address of interest is a digital word containing the proper instructions which tell the digital radio frequency (RF) synthesizer 14 how to transform output 16 of quartz crystal (XTAL) frequency standard 18 into the desired channel frequency. The modulator/demodulator 26 and radio frequency stages 28 perform conventional functions. In addition, transceiver 12 is capable of having a squelch and voice controlled operation incorporated within audio amplifier/VOX/squelch 30. Squelch is an optional receiver feature that disables the audio channel and speaker, preventing annoying random noises from being heard, but turns them on when a transmission of sufficient strength is received. VOX, or voice controlled operation, is an optional transmitter feature that allows the transmitter to be keyed on by sufficiently loud sounds, such as a voice, instead of by the usual push button. This convenience allows for "no hands" operation.

Unfortunately, as pointed out hereinabove, once contact is made on a calling channel and the communicating parties agree to switch to an alternate channel, there is no way of knowing whether the alternate channel is vacant. In many instances the alternate channel is even more congested than the calling channel, and, as a result thereof, serious confusion and delay may result.

Figure 2:
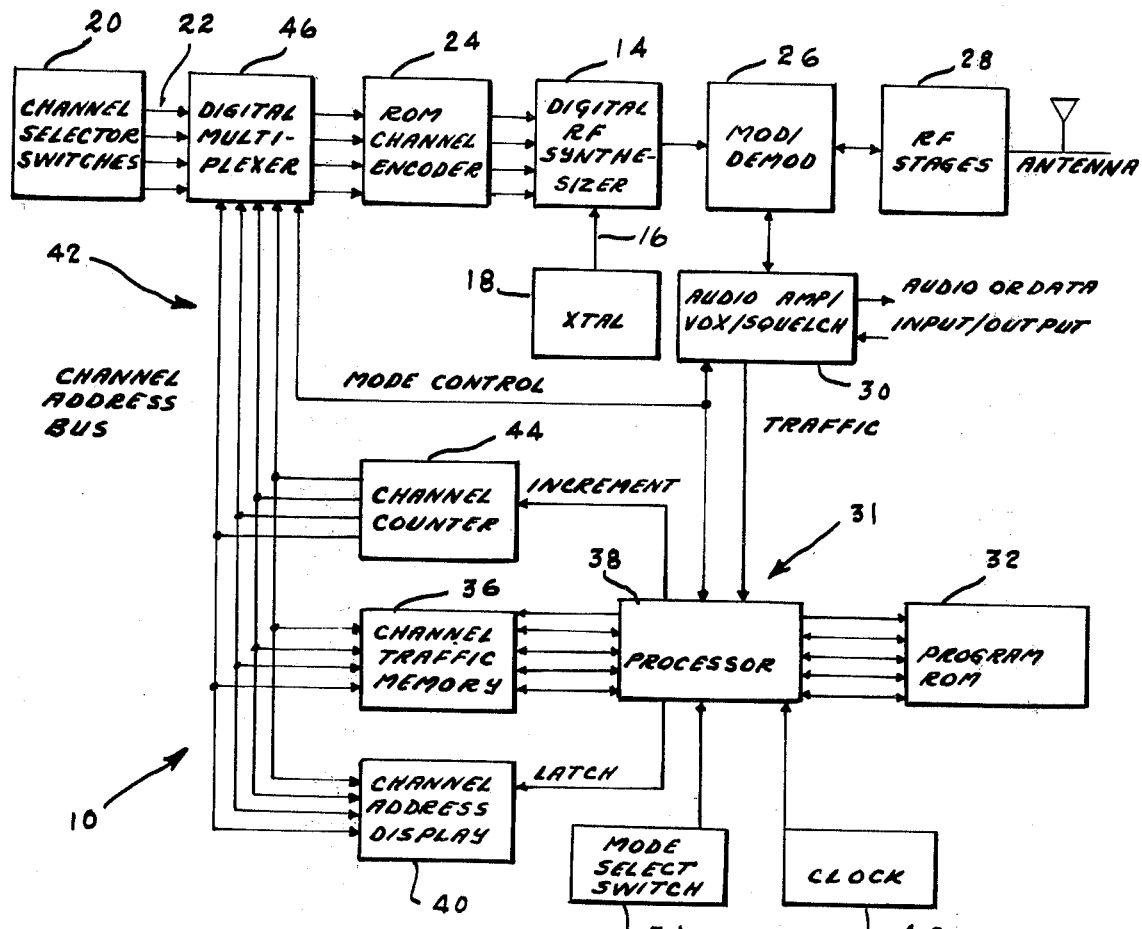
FIG. 2 is a schematic representation of the radio transceiver of this invention.

The Channel Traffic Monitoring Radio Transceiver 10 of this invention alleviates this problem. Reference is now made to FIG. 2 of the drawing which schematically represents the channel traffic monitoring radio transceiver 10 of the instant invention. For purposes of clarity, those elements which are identical in operation to the elements set forth in transceiver 10 illustrated in FIG. 1 of the drawing will be given similar numerals in FIG. 2.

Transceiver 10 incorporates therein a conventional digital RF frequency synthesizer 14 such as the HCTR 0320 RF synthesizer manufactured by the Microelectronics Products Divison of Hughes Aircraft Corporation. Synthesizer 14 performs an arithmetic operation on the output 16 of any suitable single crystal frequency standard 18. The conventional channel selector switches 20, ROM channel encoder 24, modulator/demodulator 26, RF stages 28 and audio amplifier/VOX/squelch 30 perform the same functions as their counterpart in the prior art transceiver 12 shown in FIG. 1.

Incorporated within the channel traffic monitoring radio transceiver 10 of the instant invention is a series of components which will be hereinafter referred to as microcontroller 31. The series of electronic components which make up microcontroller 31 are set forth in detail hereinbelow. These are the elements which allow transceiver 10 to automatically establish the least congested channel for communication between parties. Any conventional Read Only Memory (ROM) 32 stores the programs to be used within transceiver 10. These programs provide a plurality of modes of operation to be performed on a signal by microcontroller 31 in a manner to be described in detail hereinbelow. A conventional mode select switch 34 determines the particular operating mode to be followed.

A conventional random access Memory (RAM) 36 in the form of a channel traffic memory contains a digital word (a traffic number) for each channel address. As each channel address is fed into the channel traffic memory 36, the corresponding traffic number is made available to any suitable microprocessor 38 for updating. Microprocessor 38 may be of the type set forth on page 38 of Electronic Engineering Times (EET) dated Mar. 29, 1976.

A conventional channel address display 40 incorporates therein a latch feature that stores the contents of any suitable channel address bus 42 of the type set forth on pages 124–127 of Electronic Design 24 dated Nov. 22, 1976 whenever commanded by microprocessor 38. Channel address display 40 decodes and displays this channel address (e.g., on a light-emitting diode numeric display), and continues to store and display the same channel address even though the contents of the channel address bus 42 may change, until the next latch command is received.

A conventional channel counter 44 generates and stores the channel addresses and feeds them onto channel address bus 42. At each increment command from microprocessor 38, channel counter 44 adds "1" to the previous channel address. Channel counter 44 operates cyclically; and when it reaches its maximum count, the next increment command produces an output of "0."

Electrically connected between channel selector switches 20 and the ROM channel encoder 24 is a conventional digital multiplexer 46 which interconnects the output of microprocessor 31 and the output of channel selector switches 20 to the ROM channel encoder 24. Digital multiplexer 46 has two functions:

(1) As directed by microprocessor 38, multiplexer 46 feeds channel address data from either channel selector switches 20 or channel address bus 42 to the ROM channel encoder 24; and (2) Multiplexer 46 feeds a signal to microprocessor 38 that is a logical high only when the channel addresses from these two sources are equal.

Any suitable clock 48 in the form of a conventional oscillator provides the proper timing for microprocessor 38. It may, if desired, be possible to use a signal from frequency standard 18 for this purpose.

There are at least three modes of operation for the traffic monitoring radio transceiver 10 of this invention. These modes of operation are set forth hereinbelow:

(1) MANUAL: The microprocessor 38 is instructed to command the digital multiplexer 46 to pass channel addresses from the Channel Selector Switches 20 to the ROM channel encoder 24 and to ignore the channel address bus 42. The transceiver 10 in this instance behaves like transceiver 12 of FIG. 1.

(2) SCANNER: In this mode, if audio amplifier 30 is keyed (by either push button or VOX), transceiver 10 transmits on the channel set by the channel selector switches 20. Otherwise, transceiver 10 receives in the scanning mode, with microprocessor 38 operating under the following program contained in program ROM 32:

(a) Digital multiplexer 46 is directed to feed the contents of channel address bus 42 to the ROM channel encoder 24, which in turn tells the digital RF synthesizer 14 to tune to the corresponding channel frequency. If a transmission is detected, the traffic signal to the microprocessor 38 goes to a logical high; if not, it stays low;

(b) The microprocessor 38 waits a preset number of clock cycles. If the traffic signal is then low, microprocessor 38 goes to step d;

(c) If the traffic signal is high, microprocessor 38 activates the audio channel and waits for the traffic signal to go low. If it goes low but remains low for less than a preset number of clock cycles, microprocessor 38 returns to step c. If it stays low for the preset number of cycles, microprocessor 38 again squelches the audio channel;

(d) Microprocessor 38 commands channel counter 44 to increment its contents by one and then returns to step a;

(3) CHANNEL TRAFFIC MONITORING MODE: As in the scanning mode (2), transceiver 10 transmits whenever keyed on the channel set by the channel select switches 20. Otherwise, it receives, with microprocessor 38 following this program in the program ROM 32:

(e) (Same as a.) The channel address bus 42 contents are fed by digital multiplexer 46 to the ROM channel encoder 24, telling synthesizer 14 to tune to the corresponding channel frequency. If a transmission is detected, the traffic signal is high; if not, low;

(f) Microprocessor 38 reads the traffic number in the channel traffic memory 36 corresponding to the selected channel. For example, suppose the traffic number is a four-bit word with a maximum value of 15, denoting very heavy traffic, and a minimum of 0, denoting no traffic. If the traffic number equals 15 or 0, microprocessor 38 goes directly to step g. Otherwise, if the traffic signal is high, microprocessor 38 adds 1 to the traffic number; if low, it subtracts 1;

(g) Microprocessor 38 stores the updated traffic number in the channel traffic memory 36, displacing the old value;

(h) Microprocessor 38 contains an internal register where it stores the lowest-valued traffic number. Processor 38 compares the new traffic number with the previous low value. If the new traffic number is lower than the previous low value, it stores the new value, displacing the old value, and commands channel address display 40 to latch onto and display the current channel address. If the new traffic number is equal to or greater than the previous low value, microprocessor 38 goes directly to step i;

(i) If the channel address set on the channel select switches 20 is unequal to the contents of channel address bus 42, processor 38 goes directly to step k. If the two addresses are equal, processor 38 sets the previous low value of traffic number equal to 15;

(j) If the traffic signal is low, microprocessor 38 goes to step k. If high, the audio channel is activated to play the transmission, and processor 38 waits for the traffic signal to go low. If it stays low for less than a preset number of clock cycles, processor 38 reenters step j. If it stays low for the preset number of cycles, microprocessor 38 again squelches the audio channel.

(k) Microprocessor 38 commands the channel counter 44 to increment its contents by one. Microprocessor 38 then returns to step e.

It can therefore clearly be seen that, after transciver 10 has operated a short while under control of the above program, channel traffic memory 36 will contain a traffic number for each channel, showing the relative traffic on each channel. The lowest-valued traffic number will be stored in an internal register in microprocessor 38, for comparison with each new traffic number as it comes along, and the channel address corresponding to the lowest traffic number will be shown on the channel address display 40. All else being equal, this channel is the least congested and should be chosen as the best alternate by parties making initial contact on a calling channel.

Although this invention has been described with reference to a particular embodiment, it will be understood to those skilled in the art that the system architecture described is a representative system, with the details depending upon the intended use of transceiver 10 and the specific components chosen being all within the spirit and scope of the appended claims. For example, if it is arbitrarily assumed that transceiver 10 is tuned to 99 different channels, numbered from 01 to 99 in Binary Coded Decimal (BCD), or 0000 0001 to 1001 1001 in binary, a typical set of commercially available parts could be selected. Such a list is given below for the functional elements shown in FIG. 2 of the drawing which are responsible for the unique capabilities of the Channel Traffic Monitoring Radio Transceiver 10 of this invention.

(a) Processor 38 — RCA CDP1802 COSMAC CMOS 8-bit Central Processor Unit (CPU) (also by Hughes Aircraft Co.) — 1 required and RCA CD4099 CMOS 8-bit Addressable Latch IC — 1 required (b) Channel Traffic Memory 36 — RCA DCP1823S CMOS 128 word by 8 bit Random Access Memory (RAM) IC — 2 required (c) Program ROM 32 — RCA CDP1834 CMOS 1024 word by 8 bit Read Only Memory (ROM) IC — 1 required (d) Channel Counter 44 — Type 4518 CMOS Dual BCD Up-Counter IC (Fairchild, National Semiconductor, RCA, Texas Instruments, etc.) (Radio Shack #276-2490) — 1 required (e) Channel Address Display 40 — Type 4511 CMOS BCD-to-7 segment Latch/Decoder/Driver IC (Fairchild, National Semiconductor, RCA, Texas Instruments, etc.) (Radio Shack #276-2447) — 2 required and Single Digit 7 Segment LED Readout (Radio Shack #276-062) — 2 required (f) Digital Multiplexer 46 — Motorola MC14519 CMOS 4-bit AND/OR/Select Gate (also by Harris Semiconductor) — 2 required and RCA CD 4068 CMOS 8-input NAND Gate — 1 required (g) Mode Select Switch 34 — 2 pole 4 position rotary switch (Radio Shack #275-1386) — 1 required (h) Clock 48 — The CDP1802 CPU contains an internal clock oscillator circuit, and needs only an external timing crystal, such as the CY6.40 6.4MHz crystal from James Electronics, San Carlos CA. Other processors, e.g. the Intel 8080 or the Motorola 6800, have more complex timing requirements and require another special IC for this function.

It should, however, be emphasized that the above list is only representative of one of many possibilities. Furthermore, the number of channels available in the particular radio band, their spacing, and any restrictions on their use may affect the type of channel selector switches 20; the capacity of the channel counter 44, digital multiplexer 46, channel traffic memory 36, and channel address display 40; and the capacity and coding of the ROM channel encoder 24. The block labelled processor 38 may use any of several commercially available microprocessor integrated circuits, and acts as a tiny computer.

I claim:

1. In a radio transceiver having a frequency standard, means for performing an arithmetic operation on the output of said frequency standard allowing said transceiver to tune a plurality of channels, at least one channel selector switch providing an output in the form of a channel address, a read only memory and a means for transmitting and receiving a radio signal, the improvement therein being a microcontroller for automatically establishing the least congested channel for communication via said transceiver, said microcontroller comprising means for storing a plurality of computer programs necessary to provide a plurality of modes of operation on said signal, means for selecting one of said modes of operation to be performed on said signal, means for storing information about traffic on each of said channels to which said transceiver has access, means for generating and temporarily storing channel addresses, means for storing and displaying said channel addresses, means for operatively connecting together and controlling the operation of said computer program storing means, said operation selection means, said traffic information storing means, said means for generating and storing channel addresses, and said channel address storing and displaying means, said controlling means producing an output in accordance with a particular one of said programs, means operatively connected between said channel selector switches and said read only memory for determining whether control of said read only memory is by the output of said channel selector switches or by said output of said controlling means and means for timing the proper operation of said controlling means whereby said radio transceiver is capable of automatically establishing the least congested channel for communications.

2. In a radio transceiver as defined in claim 1 wherein said controlling means is a microprocessor.

3. In a radio transceiver as defined in claim 2 wherein said control determining means is a digital multiplexer.

4. In a radio transceiver as defined in claim 3 wherein said computer storing means is a read only memory.

5. In a radio transceiver as defined in claim 4 wherein said operation selection means is a mode select switch.

6. In a radio transceiver as defined in claim 5 wherein said timing means is an oscillator.

7. A method of establishing the least congested channel of communication of a plurality of channels available to radio transceiver having a receiver, said method comprising the steps of:
 (a) tuning said receiver of said transceiver in discrete frequency steps,
 (b) monitoring each of said channels for a period of time long enough to determine the presence or absence of traffic information thereon,
 (c) applying an arithmetic operation to said traffic information on each of said channels to produce data in accordance therewith,
 (d) storing said data about each of said channels,
 (e) using said stored data about each of said channels to determine on a continuous basis said least congested channel of communication.

* * * * *